(12) United States Patent
Matsuishita

(10) Patent No.: US 6,394,236 B1
(45) Date of Patent: May 28, 2002

(54) CABLE DISC BRAKE

(75) Inventor: Tatsuya Matsuishita, Sakai (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/531,569

(22) Filed: Mar. 20, 2000

(51) Int. Cl.$^7$ .............................................. F16D 55/08
(52) U.S. Cl. .................. 188/72.7; 188/24.22; 188/72.1
(58) Field of Search ................................ 188/24.11, 26, 188/24.22, 72.7, 72.8, 72.1, 72.9, 71.1, 218 XL

(56) References Cited

U.S. PATENT DOCUMENTS

| | | | | |
|---|---|---|---|---|
| 3,765,511 A | * | 10/1973 | Toyomasu | 188/26 |
| 3,789,959 A | * | 2/1974 | Kawaguchi | 188/71.9 |
| 3,949,838 A | | 4/1976 | Fuhrman | 188/26 |
| 3,989,124 A | | 11/1976 | Fujii | 188/26 |
| 4,162,720 A | * | 7/1979 | Haraikawa | 188/71.9 |
| 4,170,369 A | | 10/1979 | Strutman | 280/261 |
| 4,228,875 A | * | 10/1980 | Haraikawa et al. | 188/72.7 |
| 4,284,176 A | * | 8/1981 | Haraikawa et al. | 188/71.7 |
| 5,082,092 A | * | 1/1992 | Yoshigai | 188/24.21 |
| 5,358,078 A | | 10/1994 | Gajek et al. | 188/72.4 |
| 5,390,771 A | | 2/1995 | Hinkens et al. | 188/344 |
| 5,887,823 A | * | 3/1999 | Ziavras et al. | 244/56 |
| 5,896,956 A | * | 4/1999 | Lin et al. | 188/24.22 |
| 5,960,914 A | * | 10/1999 | Isai | 188/72.8 |
| 5,979,609 A | * | 11/1999 | Tsai | 188/26 |
| 6,206,144 B1 | * | 3/2001 | Di Bella | 188/26 |

FOREIGN PATENT DOCUMENTS

JP             4894132           12/1973

* cited by examiner

Primary Examiner—Christopher P. Schwartz
Assistant Examiner—Mariano Sy
(74) Attorney, Agent, or Firm—Shinjyu Global IP Counselors, LLP

(57) ABSTRACT

A bicycle cable disc brake is provided with an adjustable return spring for moving the cable disc brake from a braking position to a release position. Basically, the cable disc brake has a cable housing, a pair of friction members, a cable actuated mechanism and a biasing member. The first friction member is movably coupled to the caliper housing between a release position and a braking position. The second caliper is also coupled to the caliper housing and arranged substantially parallel to the first friction member to form a rotor receiving slot therebetween. The cable actuated mechanism is movably coupled to the caliper housing to move the first friction member from the release position towards the second friction member to the braking position. The biasing member has a first end adjustably coupled to the caliper housing and a second end adjustably coupled to the cable actuated mechanism to urge the cable actuated mechanism to the release position.

16 Claims, 18 Drawing Sheets

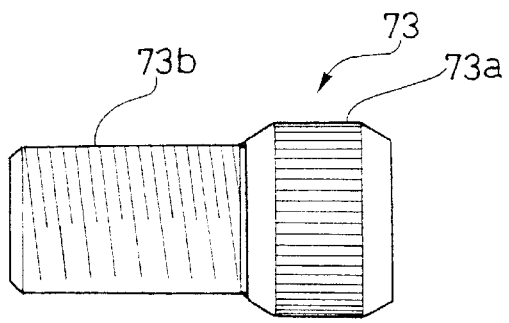
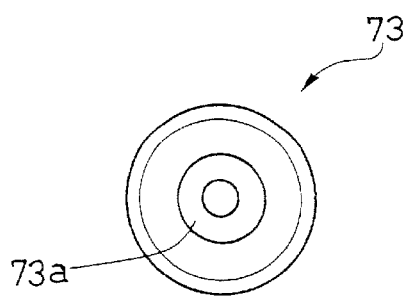
FIG. 13    FIG. 14
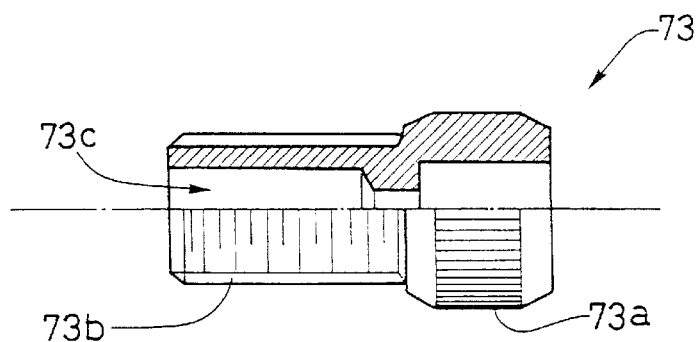
FIG. 15
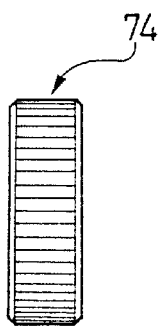
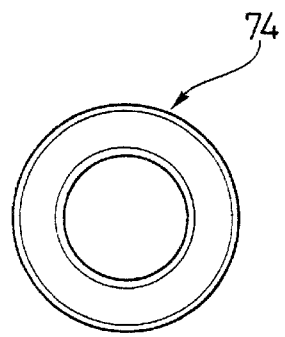
FIG. 16    FIG. 17

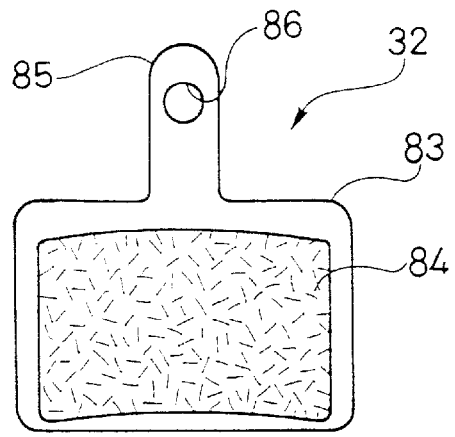
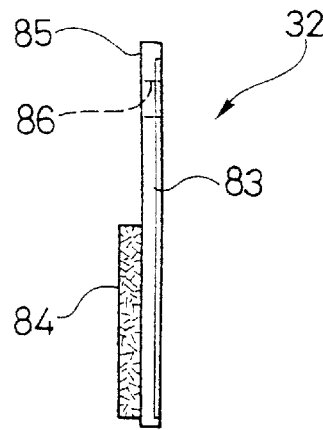
FIG. 21  FIG. 22
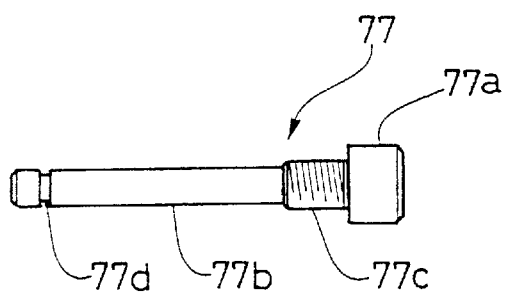
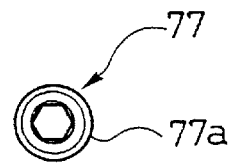
FIG. 23  FIG. 24

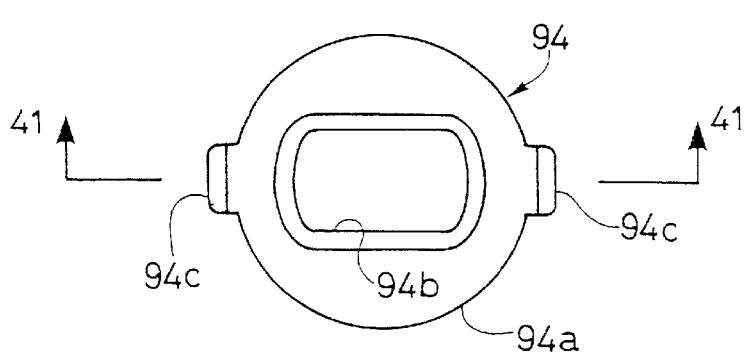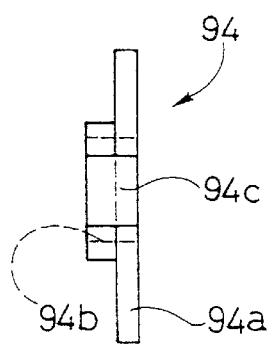
FIG. 39    FIG. 40
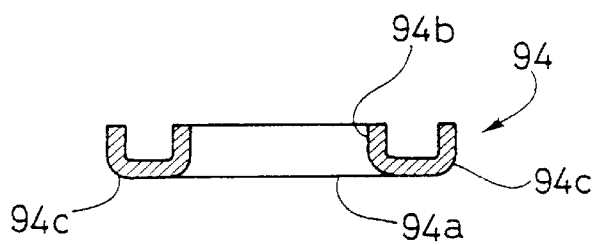
FIG. 41
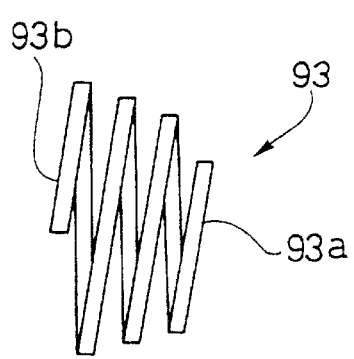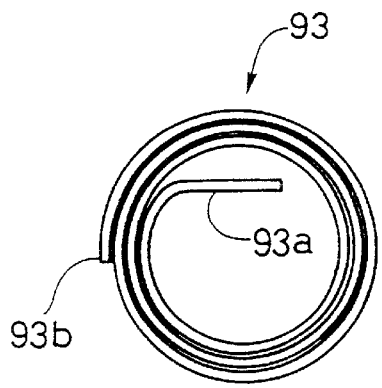
FIG. 42    FIG. 43

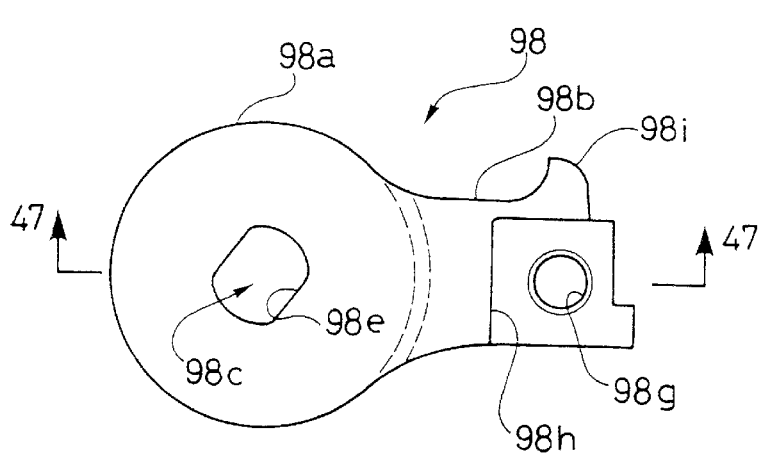
FIG. 44  FIG. 45
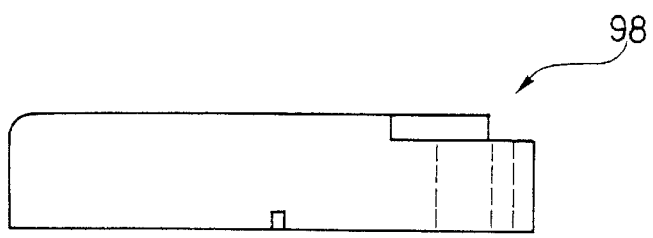
FIG. 46
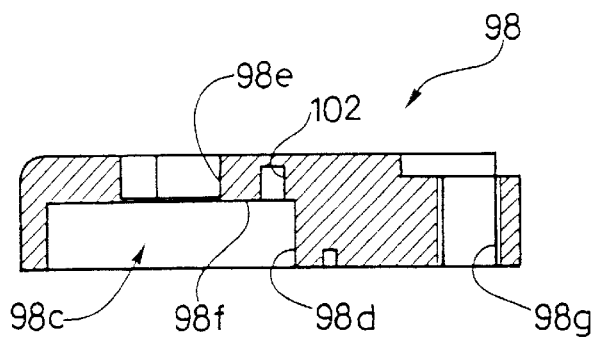
FIG. 47

CABLE DISC BRAKE

BACKGROUND OF THE INVENTION

1. Field of the Invention

This invention generally relates to a cable operated disc brake for a bicycle. More specifically, the present invention relates to a cable operated disc brake with an adjustable return spring for moving the cable disc brake from a braking position to a release position.

2. Background Information

Bicycling is becoming an increasingly popular form of recreation as well as a means of transportation. Moreover, bicycling has become a very popular competitive sport. Whether the bicycle is used for recreation, transportation or competition, the bicycle industry is constantly improving their components. One particular component of the bicycle, which has been extensively redesigned over the past years, is the braking systems of bicycles. In particular, the braking power of the braking systems is constantly being increased.

There are several types of bicycle brake devices, which are currently available on the market. Examples of some types of common bicycle brake devices include rim brakes, caliper brakes and disc brakes. If a rider wants a very high performance brake system, then the rider typically wants a disc brake system. Disc brake systems provide a substantial braking power in relationship to the amount of braking force applied to the brake lever. Moreover, disc brake systems typically provide a high level of consistency in all types of weather and riding conditions. Of course, riders constantly desire better performance from disc braking systems, i.e., disc brake systems that have more braking power.

Conventionally, a disc brake is composed of a pair of brake pads that are movably mounted to a caliper housing. The brake pads are pressed against a disc or rotor that is fixed to the wheel to halt the rotation of the disc and thus the wheel. The brake pads are moved toward the disc hydraulically or mechanically such as by a cam mechanism. The hydraulic disc brake systems are typically complicated in construction and expensive to manufacture. Moreover, hydraulic disc brake systems are often quite heavy in construction.

The mechanical disc brake system includes a caliper housing with one brake pad that is fixed to the caliper housing and one brake pad that is movably mounted to the caliper housing by a cam mechanism. A swinging arm is coupled to the cam mechanism to move the movable pad by a cam action. Typically, a conventional brake cable is coupled to a brake lever to move the swinging arm, and thus, operate the cam mechanism. While mechanical disc brake systems are typically less expensive and lighter than hydraulic disc brake systems, mechanical disc brake systems can still be complicated in construction and requires many parts resulting in expensive manufacturing costs, as with a hydraulic disc brake system.

Since a conventional brake cable coupled to a brake lever is used to move the swinging arm, it is typically necessary to provide the mechanical disc brake with one or more return springs for moving the swinging arm and the cam mechanism from the braking position back to the release position. Often, the return spring or springs are not adjustable. The return spring or springs should not only ensure separation of the brake pads, but also make sure the cam mechanism, the swing arm and the cable all move efficiently back to the release position. Of course, the biasing force developed by the return spring or springs should not be too high so that it is difficult for the rider to move the brake pads to the braking position. Thus it is desirable to provide an adjustment mechanism for the return spring or springs of the disc brake.

In view of the above, there exists a need for a disc brake with an adjustably return spring, which overcomes the problems of prior art disc brakes. This invention addresses this need in the prior art as well as other needs, which will become apparent to those skilled in the art from this disclosure.

SUMMARY OF THE INVENTION

One object of the present invention is to provide a cable disc brake that has an adjustment mechanism for the return spring of the disc brake.

Another object of the present invention is to provide a cable disc brake that is relatively compact and lightweight in relation to the amount of braking power.

Another object of the present invention is to provide a cable disc brake that is relatively inexpensive to manufacture.

The foregoing objects can be basically attained by providing a cable disc brake comprising a caliper housing, a first friction member, a second friction member, an actuated mechanism and a biasing member. The first friction member is movably coupled to the caliper housing between a release position and a braking position. The second friction member is coupled to the caliper housing and arranged substantially parallel to the first end friction member to form a rotor receiving slot therein between. The cable actuated mechanism is movably coupled to the caliper housing to move the first friction member from the release position towards the second friction member to the braking position. The biasing member has a first end adjustably coupled to the caliper housing and a second end adjustably coupled to the cable actuated mechanism to urge the cable actuated mechanism to the release position.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 13 is a side elevational view of the cable adjusting bolt for the adjusting unit of the front cable disc brake illustrated in FIGS. 2 and 4–5;

FIG. 14 is an end elevational view of the cable adjusting bolt illustrated in FIG. 13 for the cable adjusting unit of the front cable disc brake illustrated in FIGS. 2 and 4–6;

FIG. 15 is a partial, longitudinal cross-sectional view of the cable adjusting bolt illustrated in FIGS. 13 and 14 for the cable adjusting unit of the front cable disc brake illustrated in FIGS. 2 and 4–6;

FIG. 16 is a side elevational view of the cable adjusting nut for the cable adjusting unit of the front cable disc brake illustrated in FIGS. 2 and 4–5;

FIG. 17 is an end elevational view of the cable adjusting nut for the cable adjusting unit of the front cable disc brake illustrated in FIGS. 2 and 4–6;

FIG. 21 is a side elevational view of one of the brake pads for the front cable disc brake illustrated in FIGS. 2 and 4–6;

FIG. 22 is an edge elevational view of the brake pad illustrated in FIG. 21 for the front cable disc brake illustrated in FIGS. 2 and 4–6;

FIG. 23 is a side elevational view of the pad axle for the front cable disc brake illustrated in FIGS. 2 and 4–6;

FIG. 24 is an end elevational view of the pad axle illustrated in FIG. 23 for the front cable disc brake illustrated in FIGS. 2 and 4–6;

FIG. 39 is an end elevational view of the output cam rotation stopper for the front cable disc brake illustrated in FIGS. 2 and 4–6;

FIG. 40 is a side edge elevational view of the output cam rotation stopper illustrated in FIG. 39 for the front cable disc brake illustrated in FIGS. 2 and 4–6;

FIG. 41 is a transverse cross-sectional view of the output cam rotation stopper illustrated in FIGS. 39 and 40 for the front cable disc brake illustrated in FIGS. 2 and 4–6, as viewed along section lines 41—41 of FIG. 39;

FIG. 42 is an output cam return spring for the front cable disc brake illustrated in FIGS. 2 and 4–6;

FIG. 43 is an end elevational view of the output cam return spring illustrated in FIG. 42 for the front cable disc brake illustrated in FIGS. 2 and 4–6;

FIG. 44 is an end elevational view of the actuating arm for the front cable disc brake illustrated in FIGS. 2 and 4–6;

FIG. 45 is a side edge elevational view of the actuating arm illustrated in FIG. 44 for the front cable disc brake illustrated in FIGS. 2 and 4–6;

FIG. 46 is a bottom plan view of the actuating arm for the front cable disc brake illustrated in FIGS. 2 and 4–6;

FIG. 47 is a cross-sectional view of the actuating arm illustrated in FIGS. 44–46 for the front cable disc brake illustrated in FIGS. 2 and 4–6, as viewed along section line 47—47 of FIG. 44;

DETAILED DESCRIPTION OF THE PREFERRED EMBODIMENTS

Figure 1:
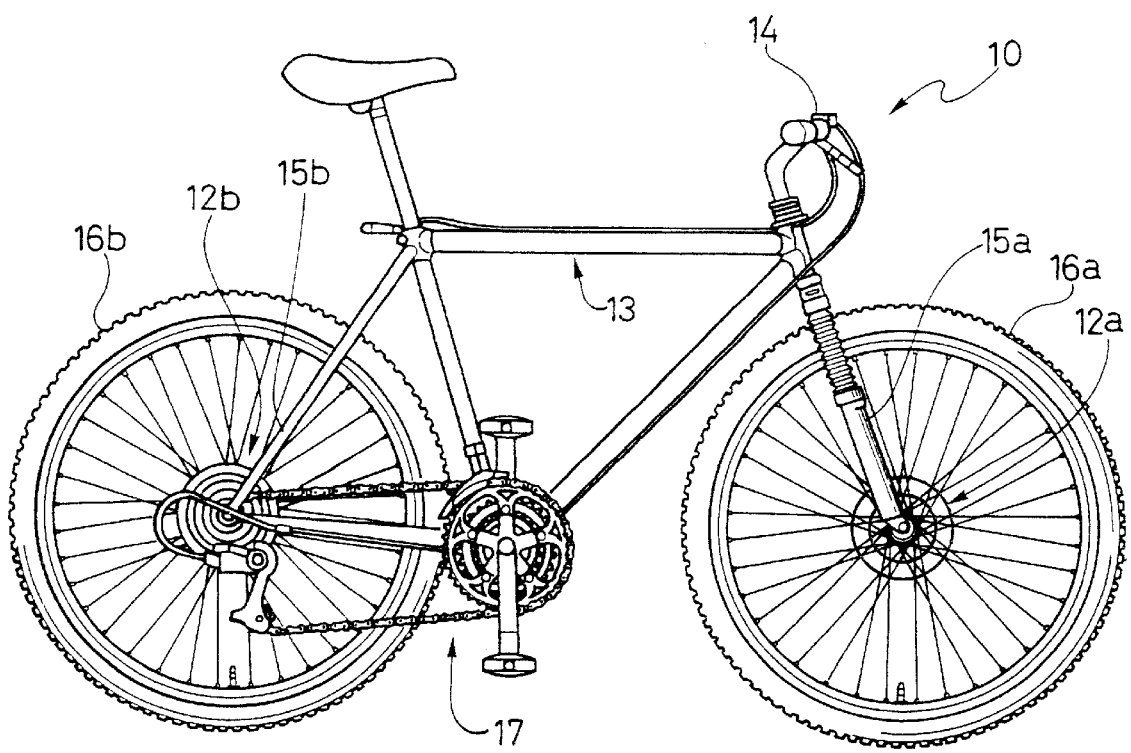
FIG. 1 is a side elevational view of a bicycle with a pair of cable disc brakes coupled thereto in accordance with one embodiment of the present invention.
Figure 2:
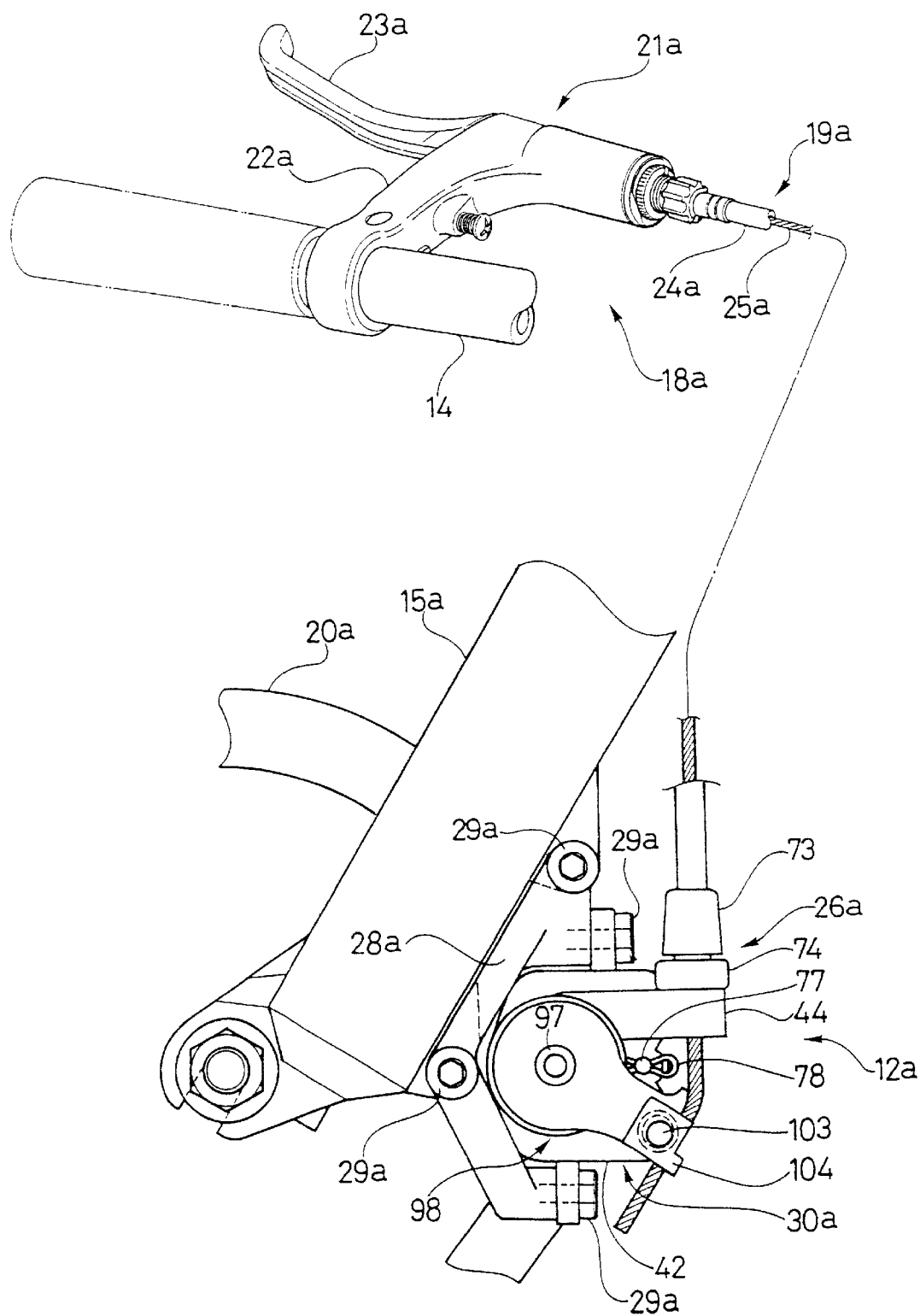
FIG. 2 is a side elevational view of a front portion of a bicycle with a front cable disc brake coupled thereto in accordance with one embodiment of the present invention.
Figure 3:
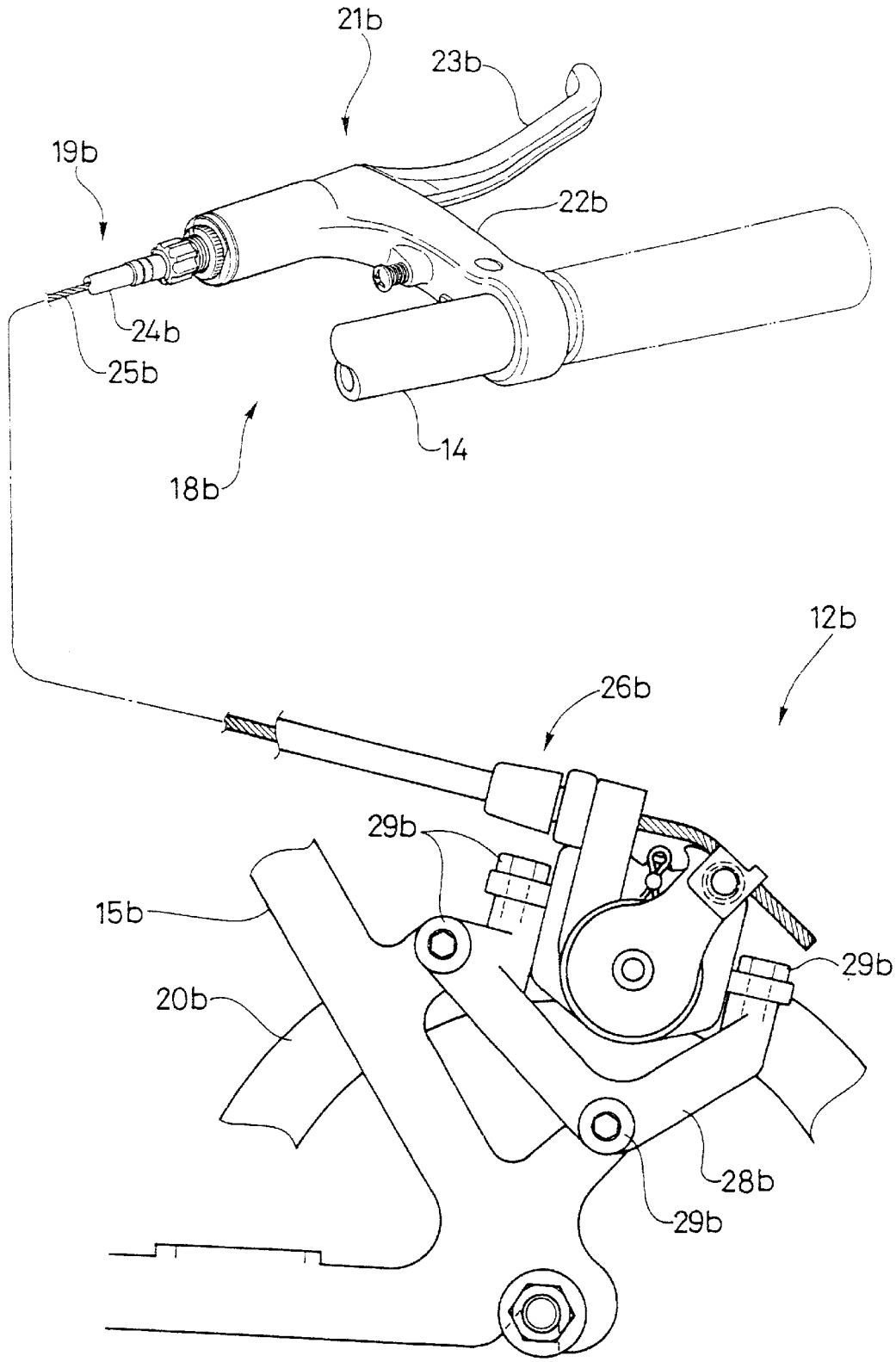
FIG. 3 is a side elevational view of a rear portion of a bicycle with a rear cable disc brake coupled thereto in accordance with one embodiment of the present invention.

Referring initially to FIGS. 1–3, front and rear portions of a bicycle 10 are illustrated with a pair of cable disc brakes 12*a* and 12*b* coupled thereto in accordance with one embodiment of the present invention. Bicycles such as bicycle 10 are well known in the art, and thus, bicycle 10 and its various components will not be discussed or illustrated in detail herein. It will be apparent to those skilled in the art that bicycle 10 can be any type of bicycle, e.g. mountain bike, a hybrid bike or a road bike. Bicycle 10 is a conventional bicycle, which basically includes a bicycle frame 13 with a handlebar 14 front and rear forks 15*a* and 15*b*, front and rear wheels 16*a* and 16*b* and a drive train 17.

As seen in FIGS. 2 and 3, the front and rear cable disc brakes 12*a* and 12*b* are identical to each other, except for their connections to the bicycle 10 and their respective brake operating mechanisms 18*a* and 18*b*. Specifically, the front cable disc brake 12*a* is mounted to the front fork 15*a* and operatively coupled to the front brake operating mechanism 18*a* via a front brake cable 19*a*. The rear cable disc brake 12*b*, on the other hand, is coupled to the rear fork 15*b* and the rear brake operating mechanism 18*b* via a rear brake cable 19*b*. The front and rear brake operating mechanisms 18*a* and 18*b* are well known in the art, and thus, they will not be discussed or illustrated in detail herein.

Basically, the front brake operating mechanism 18*a* is designed to actuate the front disc brake 12*a* to stop rotation of front wheel 16*a*. More specifically, the front brake operating mechanism 18*a* is operatively coupled to the front disc brake 12*a* by front brake cable 19*a* to apply a forcible gripping action on a front disc brake rotor 20*a* that is fixedly coupled to the front wheel 16*a* Likewise, the rear brake operating mechanism 18*b* is designed to actuate the rear disc brake 12*b* to stop rotation of rear wheel 16*b*. More specifically, the rear brake operating mechanism 18*b* operatively coupled to the rear disc brake 12*b* by rear brake cable 19*b* to apply a forcible gripping action on a rear disc brake rotor 20*b* that is fixedly coupled to the rear wheel 16*b*.

Preferably, the brake operating mechanisms 18*a* and 18*b* are mounted on handlebar 14. In particular, as seen in FIG. 2, the brake operating mechanism 18a has a brake lever 21*a* that includes a mounting portion 22*a* and a lever portion 23*a*. Mounting portion 22*a* is designed to be clamped onto handlebar 14 in a conventional manner. Lever portion 23*a* is pivotally coupled to mounting portion 22*a* for movement between a release position and a braking position. Normally, the lever portion 23*a* is maintained in a release position in a conventional manner, e.g. by a return spring (not shown). Likewise, as seen in FIG. 3, the rear brake operating mechanism 18*b* has a brake lever 21*b* that includes a mounting portion 22*b* and a lever portion 23*b*. Mounting portion 22*b* is designed to be clamped onto handlebar 14 in a conventional manner. Lever portion 23*b* is pivotally coupled to mounting portion 22*b* for movement between a release position and a braking position. Normally, the lever portion 23*b* is maintained in a release position in a conventional manner, e.g. by a return spring (not shown).

The front and rear brake cables 19*a* and 19*b* are well known in the art, and thus, they will not be discussed or illustrated in detail herein. Basically, the front brake cable 19*a* has an outer casing 24*a* and an inner wire 25*a*. The outer casing 24*a* extends between the mounting portion 22*a* of the brake lever 21*a* and an adjusting unit 26*a* that is mounted on the front cable disc brake 12*a* . The inner wire 25*a* is fixedly coupled to the lever portion 23*a* of the brake lever 21*a* and a portion of the front cable disc brake 12*a* as discussed below. Similarly, the rear brake cable 19*b* has an outer casing 24*b* and an inner wire 25*b*. The outer casing 24*b* extends between the mounting portion 22*b* of the brake lever 21*b* and an adjusting unit 26*b* that is mounted on the rear cable disc brake 12*b*. The inner wire 25*b* is fixedly coupled to the lever portion 23*b* of the brake lever 21*b* and a portion of the rear cable disc brake 12*b* in the same manner as in the front cable disc brake 12*a* discussed below.

Still referring to FIGS. 2 and 3, the front cable disc brake 12*a* is coupled to the front fork 15*a* via a mounting bracket 28*a* and four bolts 29*a*. Similarly, the rear cable disc brake 12*b* is coupled to the rear fork 15*b* via a mounting bracket 28*b* and four bolts 29*b*. Of course, it will be apparent to those skilled in the art from this disclosure that various other types of mounting mechanisms or assemblies can be utilized as needed and/or desired. Since cable brake discs 12*a* and 12*b* are identical to each other, only cable disc brake 12*a* will be discussed and illustrated in detail herein.

Figure 5:
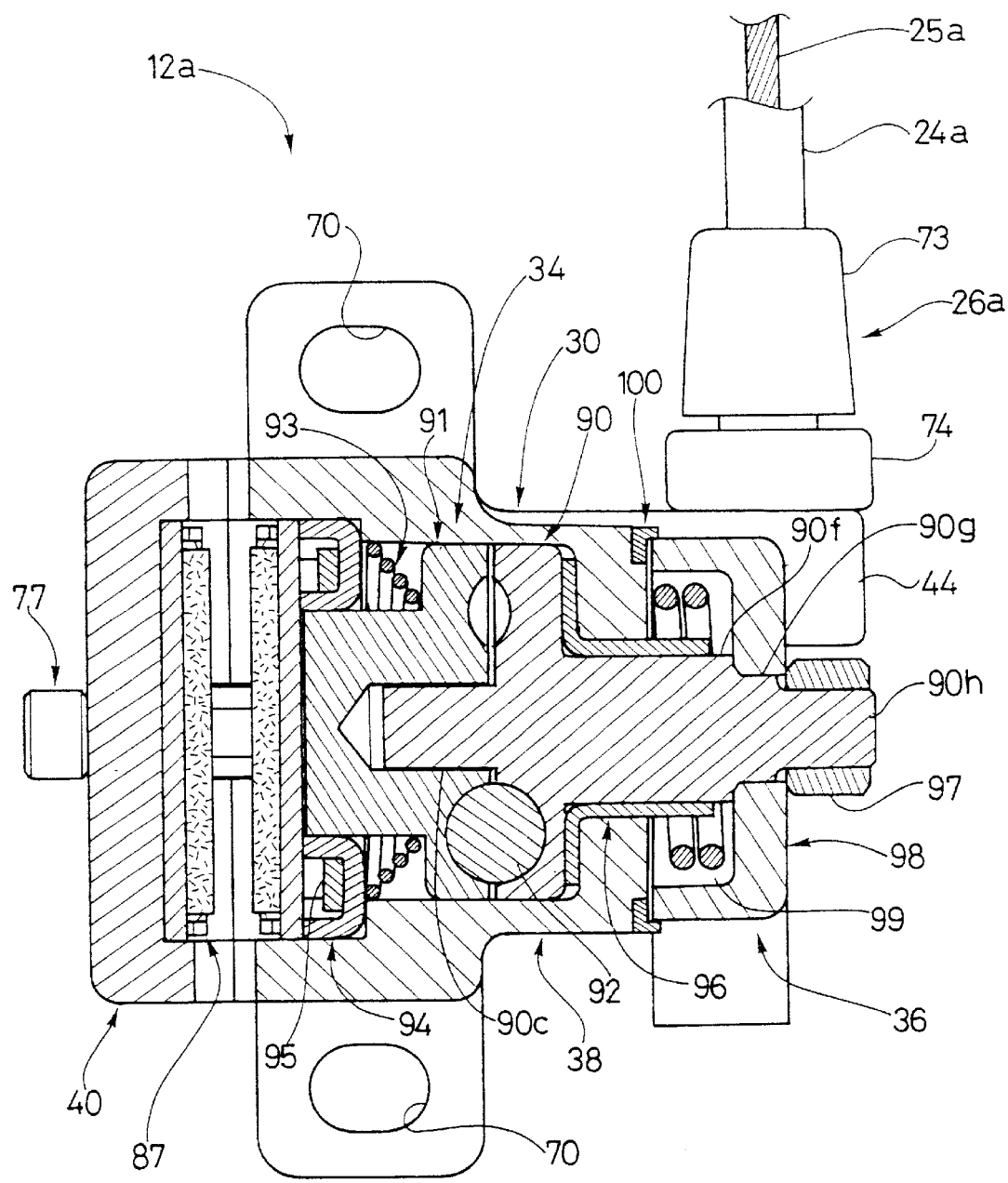
FIG. 5 is a longitudinal cross-sectional view of the front cable disc brake, as viewed along section lines 5—5 of FIG. 4.
Figure 6:
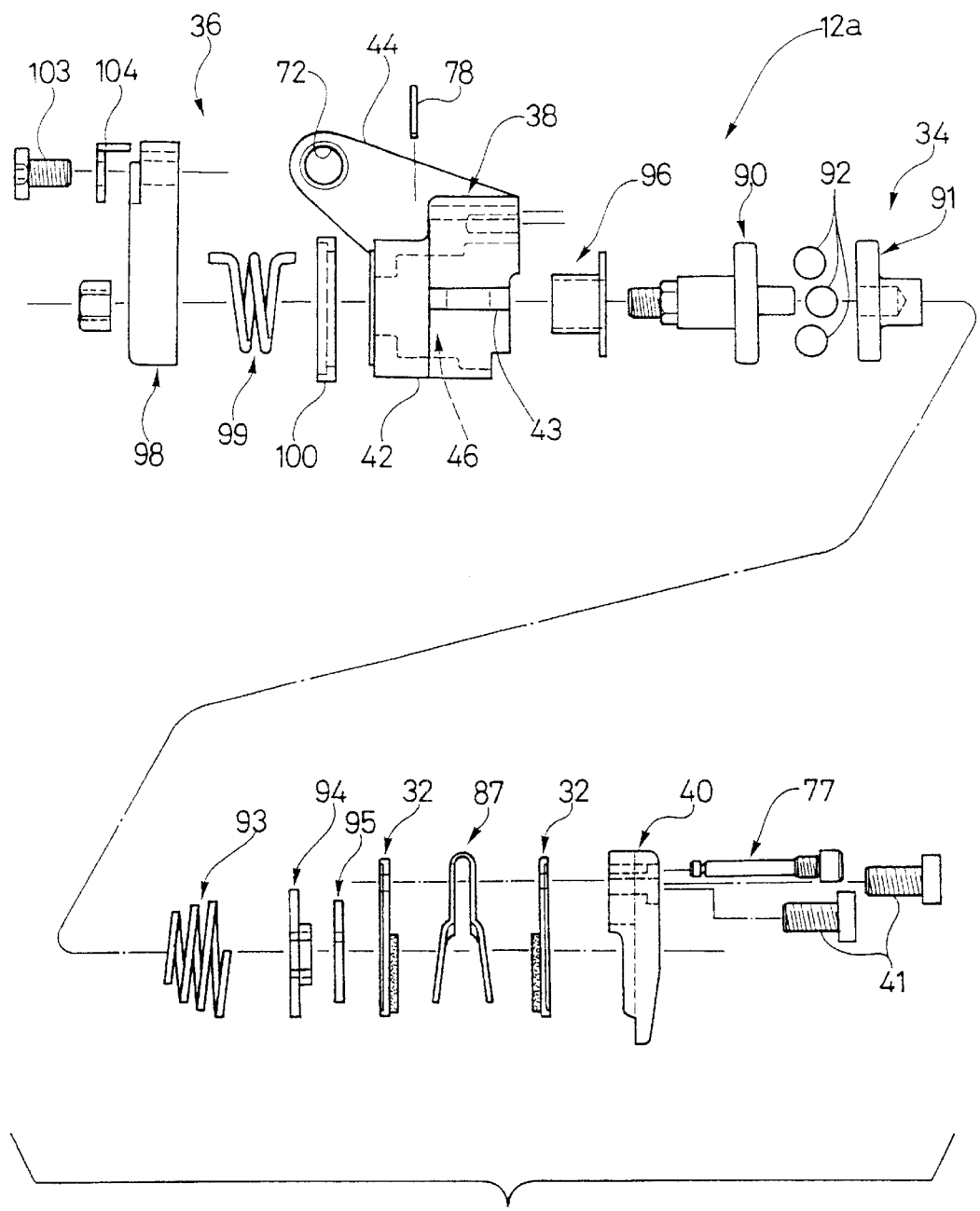
FIG. 6 is an exploded elevational view of the front cable disc brake illustrated in FIGS. 2, 4 and 5.
Figure 7:
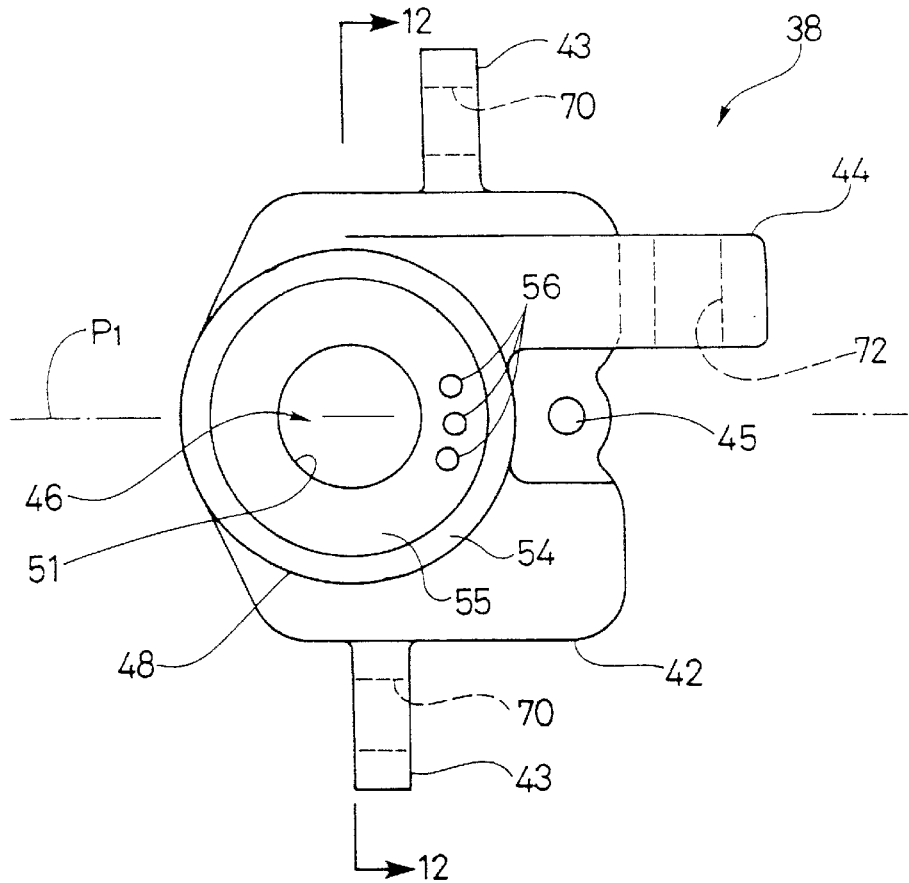
FIG. 7 is a front elevational view of a left caliper portion of the front cable disc brake illustrated in FIGS. 2 and 4–6.
Figure 8:
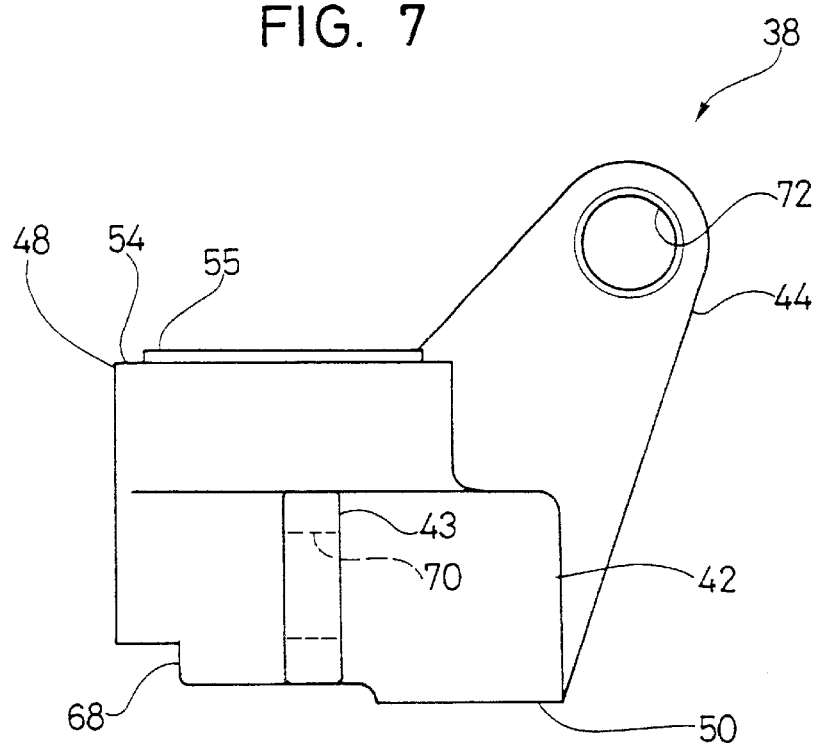
FIG. 8 is a bottom plan view of the left caliper portion of the front cable disc brake illustrated in FIGS. 2 and 4–6.
Figure 9:
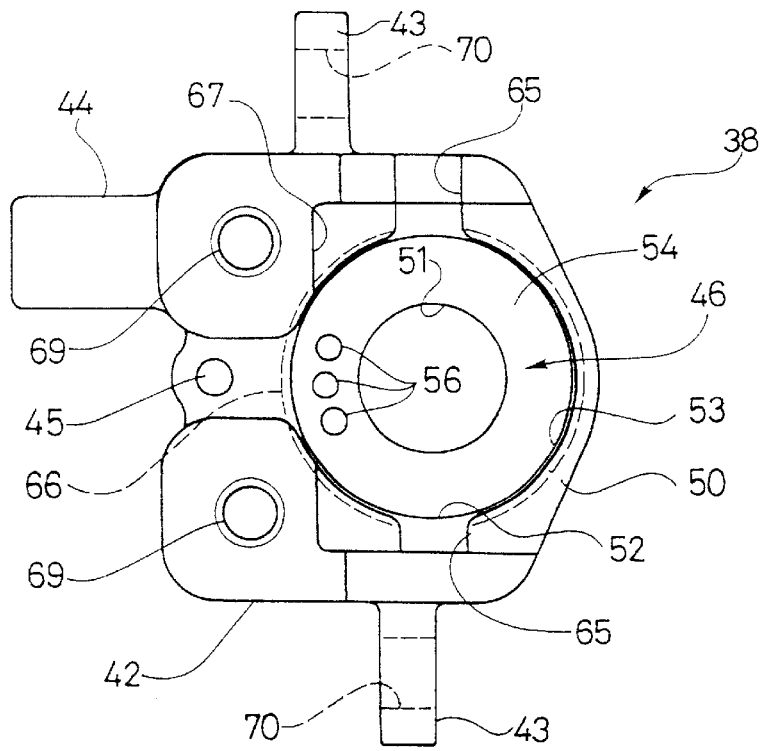
FIG. 9 is a rear elevational view of the left caliper portion illustrated in FIGS. 7 and 8 for the front cable disc brake illustrated in FIGS. 2 and 4–6.
Figure 10:
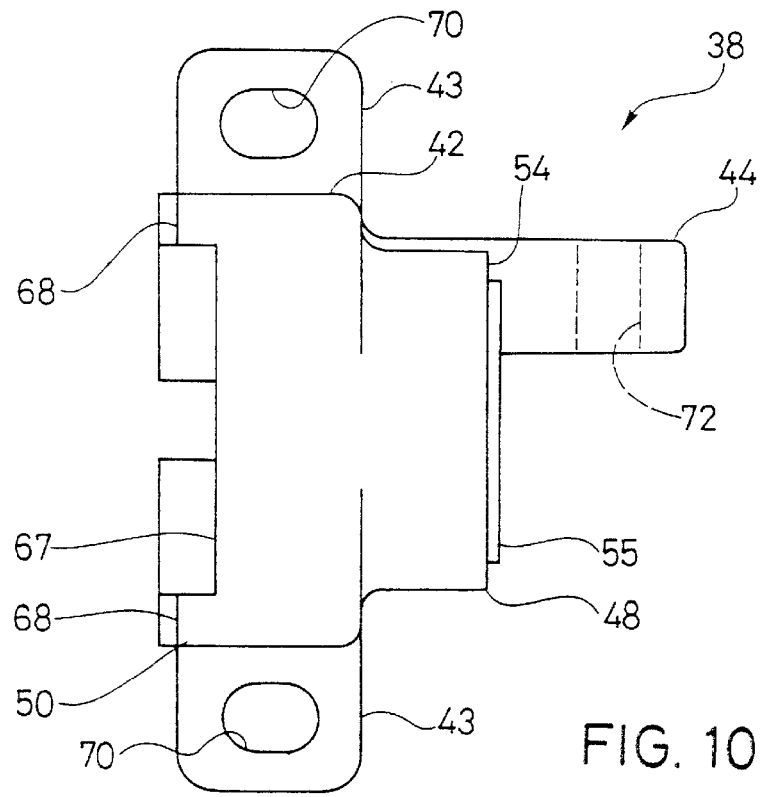
FIG. 10 is a left side elevational view of the left caliper portion illustrated in FIGS. 7–9 for the front cable disc brake illustrated in FIGS. 2 and 4–6.
Figure 11:
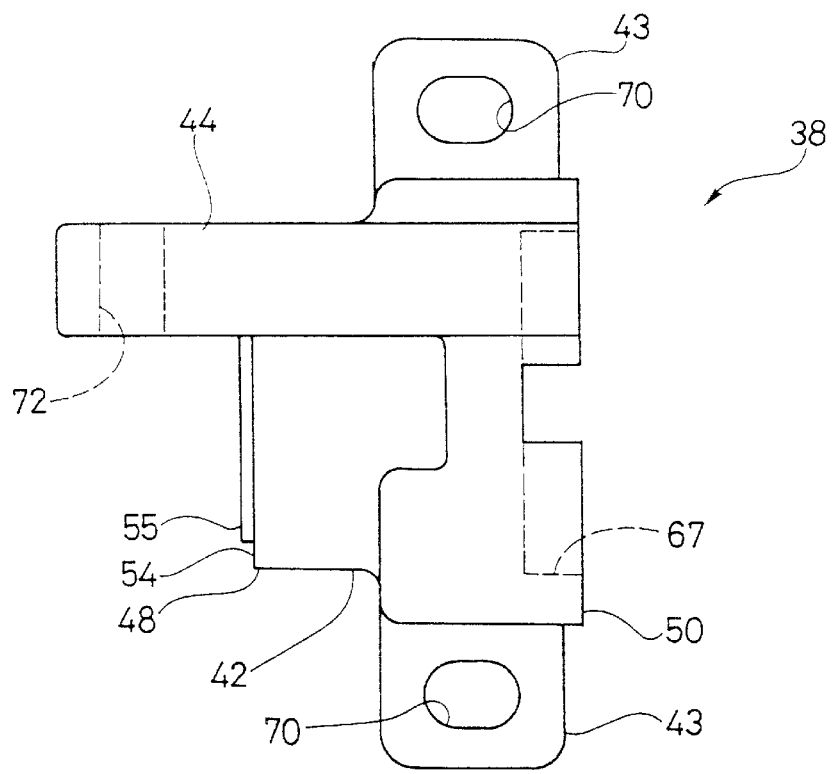
FIG. 11 is a right side elevational view of the left caliper portion illustrated in FIGS. 7–10 for the front cable disc brake illustrated in FIGS. 2 and 4–6.
Figure 12:
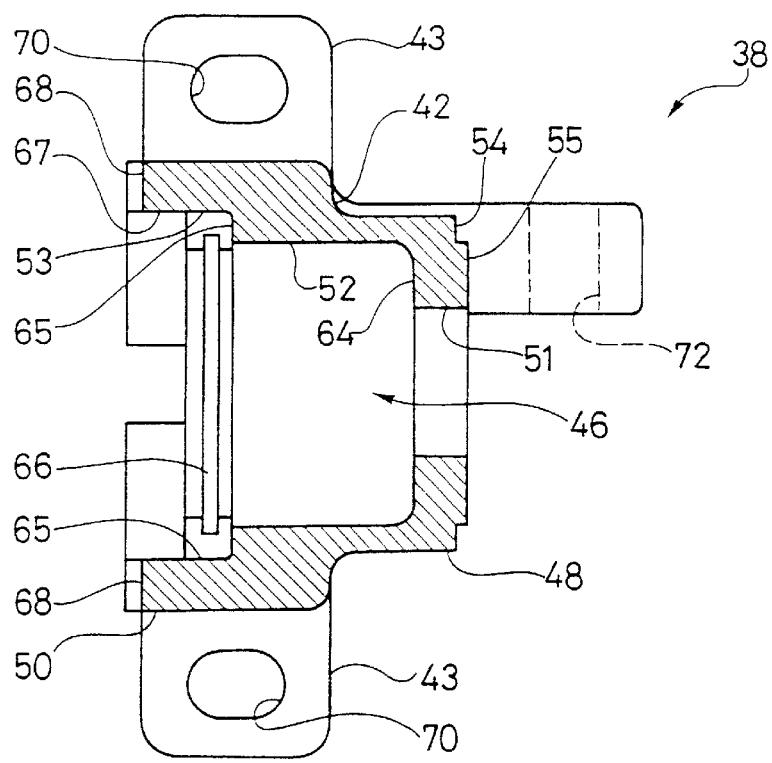
FIG. 12 is a cross-sectional view of the front left caliper portion illustrated in FIGS. 7–11, as viewed along section lines 12—12 of FIG. 7.
Figure 18:
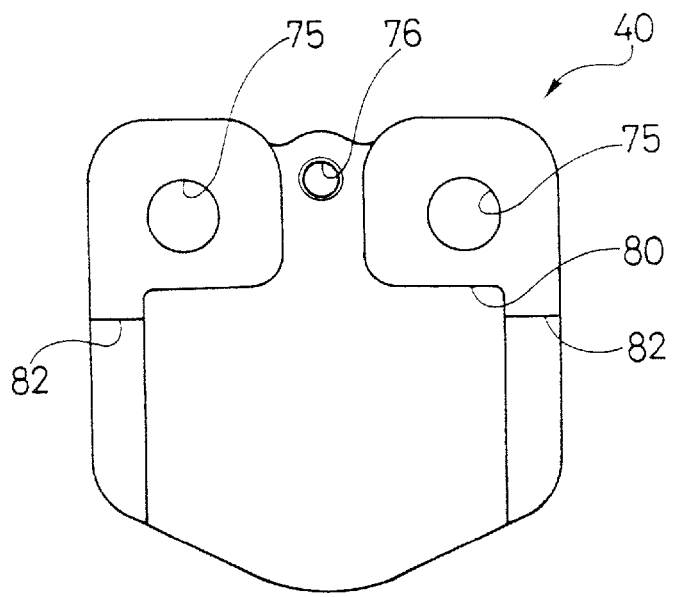
FIG. 18 is an inside elevational view of the right caliper portion of the front cable disc brake illustrated in FIGS. 2 and 4–6.
Figure 19:
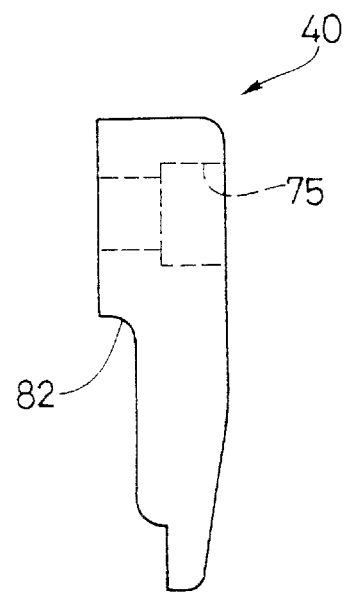
FIG. 19 is a side elevational view of the right caliper portion of the front cable disc brake illustrated in FIGS. 2 and 4–6.
Figure 20:
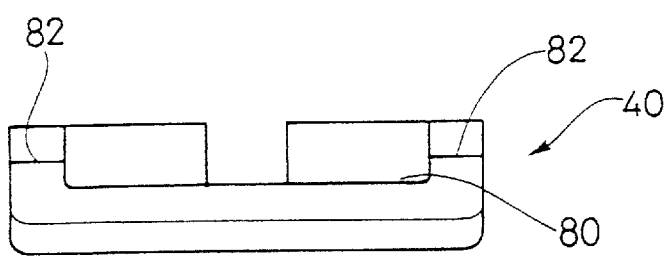
FIG. 20 is a bottom plan view of the right caliper portion illustrated in FIGS. 18 and 19 for the front cable disc brake illustrated in FIGS. 2 and 4–6.
Figure 25:
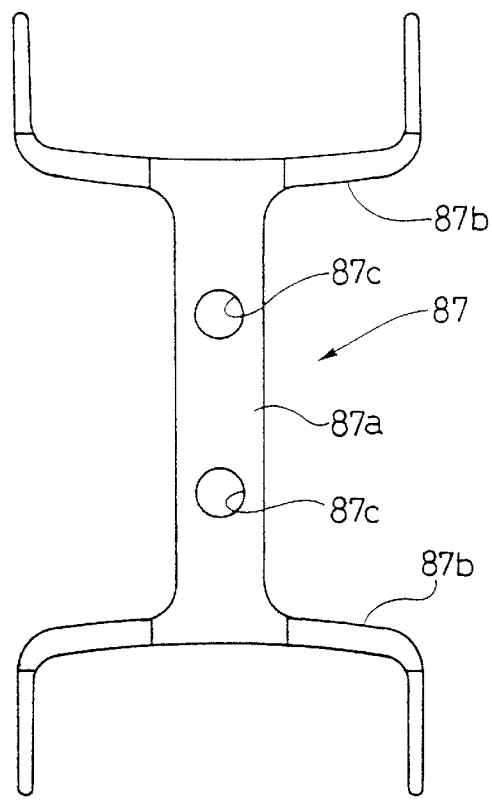
FIG. 25 is an elevational view of the pad spring prior to bending for the front cable disc brake illustrated in FIGS. 2 and 4–6.
Figure 26:
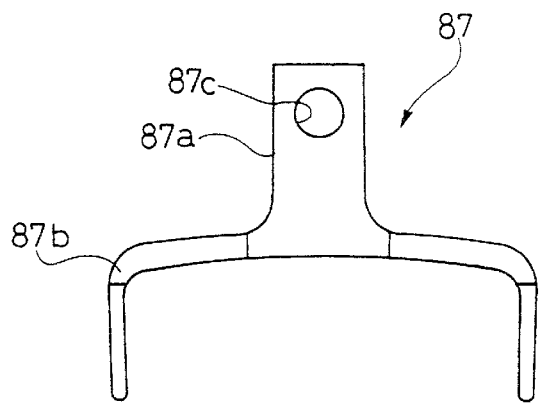
FIG. 26 is a side elevational view of the pad spring illustrated in FIG. 25 for the front cable disc brake illustrated in FIGS. 2 and 4–6.
Figure 27:
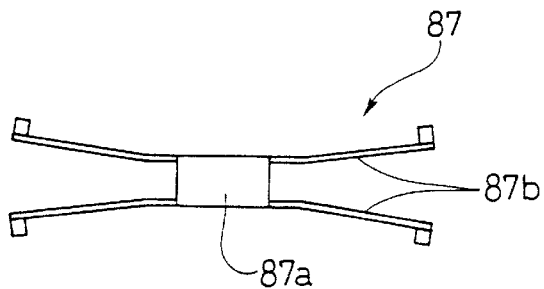
FIG. 27 is a top plan view of the pad spring illustrated in FIGS. 25 and 26 for the front cable disc brake illustrated in FIGS. 2 and 4–6.
Figure 28:
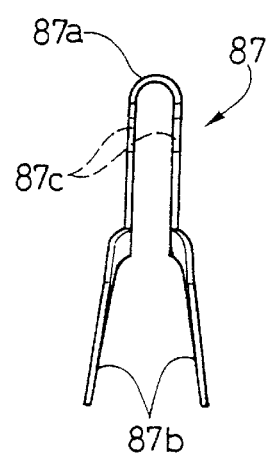
FIG. 28 is an end elevational view of the pad spring illustrated in FIGS. 25–27 for the front cable disc brake illustrated in FIGS. 2 and 4–6.
Figure 29:
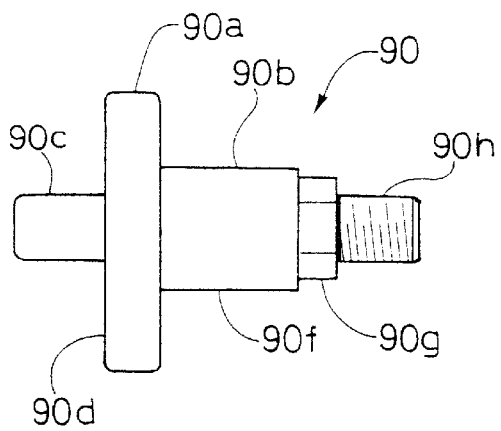
FIG. 29 is a side elevational view of the input cam for the front cable disc brake illustrated in FIGS. 2 and 4–6.
Figure 30:
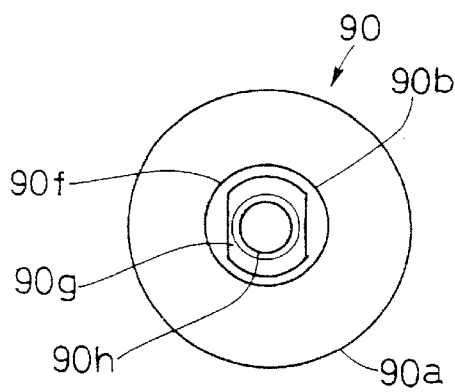
FIG. 30 is an end elevational view of the input cam illustrated in FIG. 29 for the front cable disc brake illustrated in FIGS. 2 and 4–6.
Figure 31:
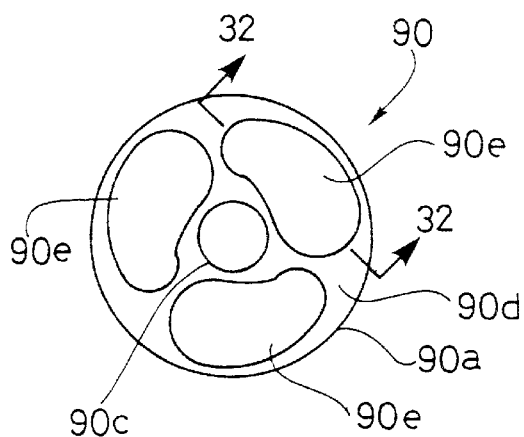
FIG. 31 is an end elevational view of the input cam illustrated in FIGS. 29 and 30 for the front cable disc brake illustrated in FIGS. 2 and 4–6.
Figure 32:
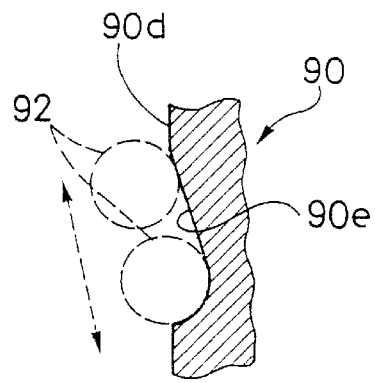
FIG. 32 is a partial, cross-sectional view of the input cam illustrated in FIGS. 29–31 as viewed along section lines 32—32 of FIG. 31.
Figure 33:
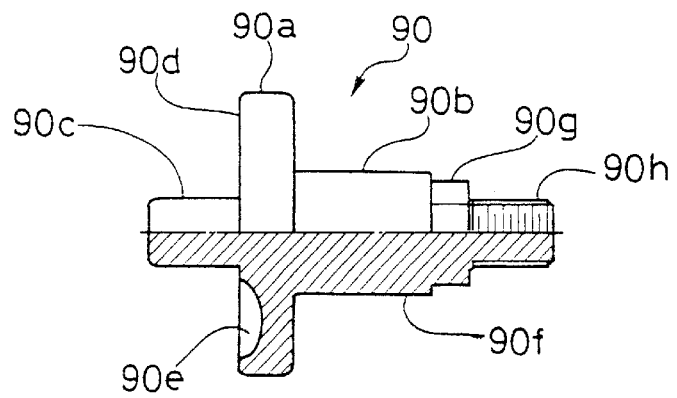
FIG. 33 is a partial, longitudinal cross-sectional view of the input cam illustrated in FIGS. 29–32 for the front cable disc brake illustrated in FIGS. 2 and 4–6.

Basically, as seen in FIGS. 5 and 6, the cable disc brake 12*a* includes a caliper housing 30, a pair of brake pads or friction members 32, a cam assembly 34 and an actuating assembly 36. The cam assembly 34 and the actuating assembly 36 together form a cable actuated mechanism that moves the brake pads between a release position and a braking position. The caliper housing 30 is mounted to the frame 13 of the bicycle 10 via the bracket 28*a* and bolts 29*a*. The brake pads 32 are movably coupled to the caliper housing 30 to move between the release position and the braking position via the cam assembly 34 and the actuating assembly 36 (cable actuated mechanism). In the release position, the pads 32 are spaced from the disc brake rotor 20*a* to allow free rotation thereof. In the braking position, the brake pads 32 are pressed against the sides of the disc brake rotor 20*a* to stop rotation of the bicycle wheel 16*a* and the disc brake rotor 20*a*.

Figure 4:
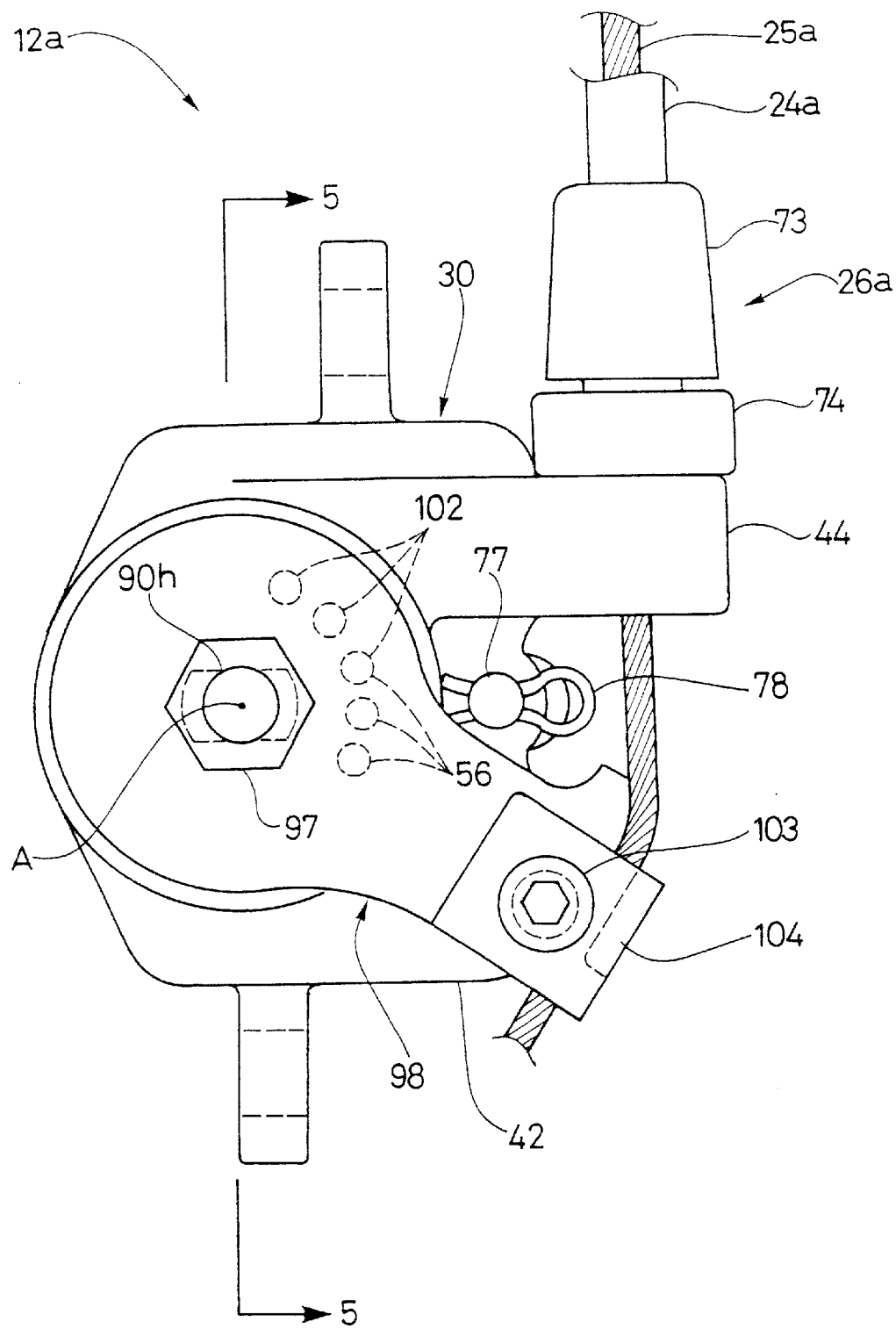
FIG. 4 is an enlarged, partial side elevational view of the front cable disc brake in accordance with the embodiment of the present invention illustrated in FIG. 2.

Turning to FIGS. 4–6, the caliper housing 30 basically includes a left caliper portion 38 and a right caliper portion 40 that are fixedly coupled together by a pair of bolts 41. When the left and right caliper housings 38 and 40 are coupled together, an internal cavity is formed for movably supporting the brake pads 32 and the cam assembly 34, as discussed below. The left and right caliper housings 38 and 40 are preferably constructed of a hard, rigid material, such as a metallic material. Of course, other suitable materials can be utilized for the left and right caliper housings 38 and 40.

As seen in FIGS. 7–12, the left caliper portion 38 basically has a body portion 42 a pair of mounting flanges 43 and a cable support flange 44. The body portion 42 has a pad support bore 45 extending in a longitudinal direction and an axially extending internal bore 46 that extends longitudinally between a first open end 48 and a second open end 50 of the left caliper portion 38. The pad support bore 45 is utilized to support the brake pads 32 on the caliper housing 30 as discussed below.

Basically, the internal bore 46 can be divided into three sections 51, 52 and 53 for supporting a part of the cam assembly 34, as discussed below. The first section 51 of the internal bore 46 is a cylindrical bore with the smallest diameter. The first section 51 of the internal bore 46 is located at a first end 48 of the left caliper portion 38. The first end 48 of the left caliper portion 38 has the actuating assembly 36 coupled thereto, as discussed below. Preferably, end surface of the first end 48 of the left caliper portion 38 has an annular step to form a pair of annular end surfaces 54 and 55 that lie in different planes. The inner end surface 55 adjacent the first section 51 of the internal bore 46 is preferably provided with three through bores 56 that are adapted to receive a part of the actuating assembly 36, as discussed below. Preferably, the centers of these bores 56 are spaced approximately twenty degrees apart in a circumferential direction. These bores 56 allow for adjustment of the actuating assembly 36, as discussed below. The middle one of the bores 56 is preferably spaced approximately four degrees in a circumferential direction from the center plane $P_1$, of the disc brake device 12a.

The second section 52 of the internal bore 46 is also a cylindrical bore that is located between the first section 51 and the third section 53. The second section 52 of the internal bore 46 has a larger diameter than the first section 51 of the internal bore 46. Thus, an internal abutment surface or end wall 64 is formed radially between the first and second sections 51 and 52 of the internal bore 46.

The third section 53 of the internal bore 46 is also cylindrical, but is a discontinuous cylinder. Specifically, the third section 53 of the internal bore 46 has a pair of longitudinal slots 65 and an annular groove 66 formed therein. The slots 65 that are spaced 180° apart and divide the annular groove 66 into two sections.

The second end 50 of the left caliper portion 38 is provided with a pair of threaded bores 69 for receiving the bolts 41 to secure the left and right caliper housings 38 and 40 together. The second end 50 of the left caliper portion 38 has a brake pad mounting recess 67 that is substantially identical to the outer periphery of the brake pads 32. The bottom of the brake pad mounting recess 67 is open and the sides of the second end 50 of the caliper housing 38 has a pair of cutouts 68 for accommodating a portion of the disc brake rotor 20a therein.

The mounting flanges 43 of the left caliper portion 38 preferably have slots 70 to allow axial adjustment to and from the disc brake rotor 20a. The slots 70 receive the mounting bolts 29a therethrough to fasten the left caliper portion 38 to the front bracket 28a.

As seen in FIGS. 2, 4, 7 and 8, the cable support member or flange 44 extends outwardly from the body portion 42 in a direction that is substantially tangent to an imaginary circle with its center located at the center axis of the internal bore 46. The free end of the cable support flange 44 has a threaded hole 72 therein for receiving a cable adjusting bolt 73 of the cable adjusting unit 26a as seen in FIGS. 2 and 4. The cable adjusting unit 26a adjusts the relative tension between the outer casing 24a and the inner wire 25a. Specifically, as seen in FIGS. 13–15, the cable adjusting bolt 73 has a head portion 73a and a threaded shaft portion 73b with an axially extending bore 73c extending through both the head portion 73a and the threaded shaft portion 73b. The bore 73c is step-shaped for accommodating outer casing 24a and inner wire 25a in a conventional manner. The head portion 73a is a tubular member with a textured outer surface.

The threaded shaft portion 73b has threads on its outer surface that threadedly engaged the internal threads of the threaded hole 72. Accordingly, rotation of the cable adjusting bolt 73 causes the cable adjusting bolt 73 to move axially relative to the cable support flange 44. As seen in FIGS. 2 and 4, the cable adjusting bolt 73 has a cable adjusting nut 74 located on the threaded shaft portion 73b. The cable adjusting bolt 73 (FIGS. 13–15) and the cable adjusting nut 74 (FIGS. 16 and 17) form the cable adjusting unit 26a for controlling the tension within the brake cable 19a.

Turning now to FIGS. 6 and 18–20, the right caliper portion 40 is fixedly coupled to the second end 50 of the left caliper portion 38 by the bolts 41. The right caliper portion 40 substantially closes off the open end of the second end 50 of the left caliper portion 38, except for. a slot for accommodating the disc brake rotor 20a. Accordingly, the right caliper portion 40 has a pair of through bores 75 for receiving the bolts 41 therein. Preferably, these through bores 75 are step-shaped so that the heads of the bolts 75 are recessed from the outer surface of the right caliper portion 40.

Also, the right caliper portion 40 has a threaded bore 76 for receiving the pad axle 77 therein. Preferably, as seen in FIGS. 23 and 24, the pad axle 77 is a threaded bolt having a head portion 77a and a shaft portion 77b extending outwardly from the head portion 77a. The section of the shaft portion 77b adjacent the head portion 77a is provided with threads 77c that threadedly engage the threaded bore 76 of the right caliper portion 40. The free end of the shaft portion 77b is preferably provided with an annular recess 77d for receiving a retaining clip 78.

The inner surface of the right caliper portion 40 has a brake pad mounting recess 80 that has the shape of the periphery of the brake pad 32, such that the right brake pad 32 is securely retained against the inner surface of the right caliper portion 40. This brake pad mounting recess 80 should be sized and shaped such that the right brake pad 32 does not rotate or move. The side edges of the right caliper portion 40 has a pair of cutout portions 82 for forming a half of the disc brake rotor slot.

As seen in FIGS. 5 and 6, the left and right brake pads 32 are substantially identical to each other and can preferably be interchanged with each other. As seen in FIGS. 21 and 22, the right and left brake pads 32 each include a rigid support plate 83 and an accurate portion of friction material 84 attached to the support plate 83 for engaging the brake rotor 20a. The rigid support plate 83 having a mounting tab 85 with a bore 86 therein for receiving the pad axle 77 (FIGS. 6, 23 and 24) therethrough. When the brake pads 32 are mounted on the pad axle 77, the brake pads 32 can move axially on the pad axle 77, but cannot rotate due to the structure of the brake pad mounting recesses 67 and 80 of the left and right caliper housings 38 and 40.

As seen in FIGS. 6 and 25–28, a pad spring 87 is provided between the left and right brake pads 32 to bias them apart. The pad spring 87 is preferably constructed of a thin resilient material, such as a spring steel. The pad spring 87 has a central connecting portion 87a and a pair of biasing portions 87b extending outwardly from opposite ends of the connecting portion 87a. The connecting portion 87a is preferably an inverted U-shaped member with a pair of axially aligned holes 87c that receive the pad axle 77. The biasing portions 87b are also inverted U-shaped members that diverge outwardly to their free ends relative to a center line bisecting the connecting portion 87a.

Turning again to FIGS. 5 and 6, the cam assembly 34 basically includes an input cam 90, an output cam 91, a set of rolling members 92, a return spring 93, an output cam rotation stopper 94, a retainer 95 and a bushing 96. Basically, the cam assembly 34 is located in the internal bore 46 of the left caliper portion 38 and is adapted to expand in an axial direction by movement of the actuating assembly 36 via the brake operating mechanism 18*a*. In particular, rotation of the input cam 90 by the actuating assembly 36 causes the output cam 91 to move in an axial direction against the force of the return spring 93 and the pad spring 87 to compress the left and right. brake pads 32 together against the disc brake rotor 20*a*.

As seen in FIGS. 29–33, the input cam 90 has a cam member 90*a* with an operating shaft 90*b* extending from one end and a guide pin 90*c* extending outwardly from the other end. The cam member 90*a* has an axially facing camming surface 90*d* with three camming slots 90*e* that receive the three roller members 92 (balls). These camming slots 90*e* are preferably accurate slots that curve about the center rotational axis of the input cam 90. These camming slots 90*e* are ramp-shaped and have an angled bottom surface that is preferably sloped approximately 17° relative to a plane passing perpendicularly through the axis of rotation of the input cam 90. Accordingly, when the input cam 90 is rotated, the rolling members 92 will move in a circumferential direction within the camming slots 90*e*, such that all of the rolling members 92 are located at the same position within the camming slots 90*e* to axially move the output cam 91.

The operating shaft 90*b* is preferably a step-shaped shaft having a first cylindrical section 90*f*, a second non-cylindrical section 90*g* and a third non-cylindrical section 90*h*. The first cylindrical section 90*f* is sized to be received in the first section 51 of the internal bore 46 of the left caliper portion 38. Preferably, the bushing 96 is located around the first cylindrical section 90*f* as seen in FIG. 5. The second cylindrical section 90*g* of the operating shaft 90*b* is adapted to non-rotatably support a portion of the actuating assembly 36, as discussed below. The third section 90*h* of the operating shaft 90*b* is preferably threaded for receiving a nut 97 to secure the actuating assembly 36 thereto.

The guide pin 90*c* is preferably a short pin that is located on the longitudinal axis of the input cam 90 and engages the output cam 91 to ensure smooth movement of the output cam 91 relative to the input cam 90.

Referring now to FIGS. 34–38, the output cam 91 basically includes a camming member 91*a* and a thrust shaft 91*b*. The camming member 91*a* is preferably a cylindrical member having a camming surface 91*c* facing the camming surface 90*d* of the input cam 90. The camming surface 91*c* is preferably provided with three camming slots 91*d* that are substantially identical to the camming slots 90*e* of the input cam 90 and are adapted to engage the rolling members 92 to move the output cam 91 axially in response to rotational movement of the input cam 90.

Figure 34:
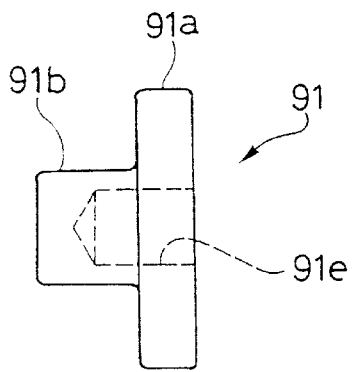
FIG. 34 is a side elevational view of the output cam for the front cable disc brake illustrated in FIGS. 2 and 4–6.
Figure 35:
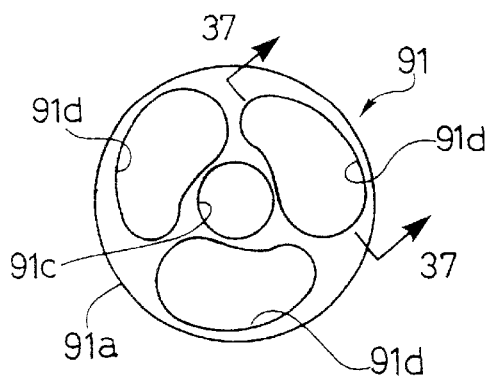
FIG. 35 is an end elevational view of the output cam illustrated in FIG. 34 for the front cable disc brake illustrated in FIGS. 2 and 4–6.
Figure 36:
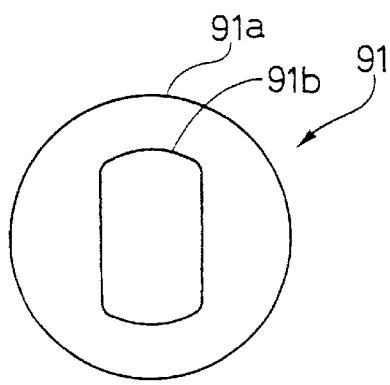
FIG. 36 is an end elevational view of the output cam illustrated in FIGS. 34 and 35 for the front cable disc brake illustrated in FIGS. 2 and 4–6.
Figure 37:
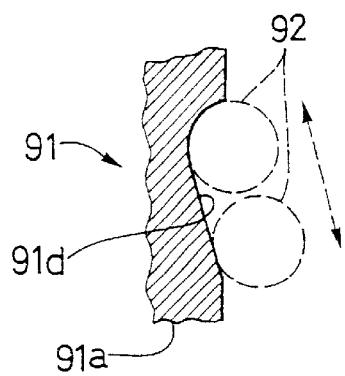
FIG. 37 is a partial, cross-sectional view of the output cam illustrated in FIGS. 34–36 as viewed along section lines 37—37 of FIG. 35.
Figure 38:
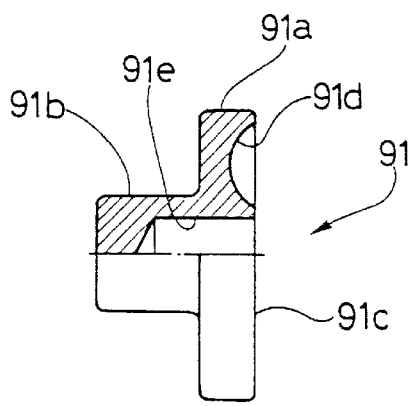
FIG. 38 is a partial, longitudinal cross-sectional view of the output cam illustrated in FIGS. 34–37 for the front cable disc brake illustrated in FIGS. 2 and 4–6.
Figure 48:
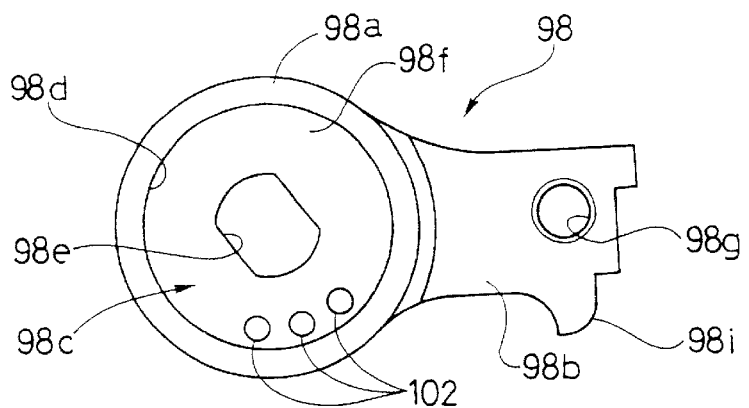
FIG. 48 is an inside end elevational view of the actuating arm illustrated in FIGS. 44–47 for the front cable disc brake illustrated in FIGS. 2 and 4–6.
Figure 49:
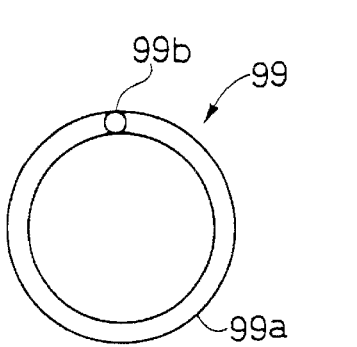
FIG. 49 is an end elevational view of the return spring for the actuating assembly of the front cable disc brake illustrated in FIGS. 2 and 4–6.
Figure 50:
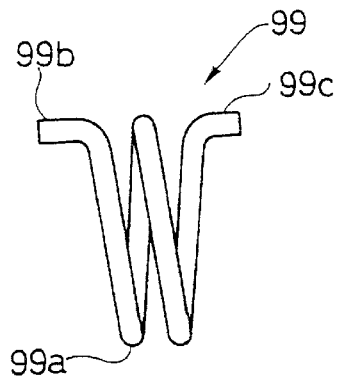
FIG. 50 is a side elevational view of the return spring illustrated in FIG. 49 for the actuating assembly of the front cable disc brake illustrated in FIGS. 2 and 4–6.
Figure 51:
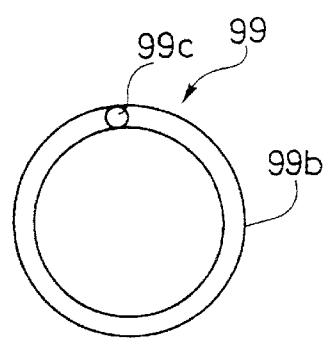
FIG. 51 is an end elevational view of the return spring illustrated in FIGS. 49 and 50 for the actuating assembly of the front cable disc brake illustrated in FIGS. 2 and 4–6.

As seen in FIGS. 5, 34 and 38, the camming surface 91*c* of the output cam 91 is also provided with a centrally located blind bore 91*e* that is adapted to receive the guide pin 90*c* therein. Preferably, the lengths of the guide pin 90*c* and the blind bore 91*e* are such that they do not disengage at any time during the axial movement of the output cam 91 relative to the input cam 90. The thrust shaft 91*b* of the output cam 91 is preferably a non-circular member that engages the output cam rotation stopper 94, which in turn engages the left caliper portion 38 so that the output cam 91 cannot rotate relative to the left caliper portion 38.

In particular, the rotation stopper 94, as seen in FIGS. 39–41, has an annular center section 94*a* with a non-circular hole 94*b* that is adapted to receive the thrust shaft 91*b* of the output cam 91 therein such that there is no relative rotation therebetween. A pair of tabs 94*c* are located 180° apart and extend radially outwardly from the center section 94*a* of the rotation stopper 94. These tabs 94*c* are received in the slots 65 of the left caliper portion 38 such that the rotation stopper 94 cannot rotate relative to the left caliper portion 38. Thus, since the rotation stopper 94 cannot rotate, the output cam 91 cannot rotate. The rotation stopper 94 is secured on the thrust shaft 91*b* of the output cam 91 by the retainer 95. The retainer 95 is preferably a C-shaped snap ring. This C-shaped snap ring or retainer 95 is received in the annular groove 66 formed in the internal bore 46 of the left caliper portion 38.

As seen in FIG. 5, the return spring 93 for the output cam 91 is located between the output cam 91 and the output cam rotation stopper 94. Preferably, the return spring 93 is a conically-shaped compression spring (as seen in FIGS. 42 and 43) that has an inner diameter at its small end 93*a* that is substantially equal to the outer width of the thrust shaft 91*b* of the output cam 91, and an outer diameter at its large end 93*b* that is substantially equal to or slightly smaller than the inner diameter of the second section 52 of the left caliper portion 38. When the cable disc brake 12*a* is assembled, the return spring 93 should not be compressed, or only under a slight amount of compression. However, this compression should not be such that it has a biasing force of the return spring 93 that is greater than the biasing force of the pad spring 87. In other words, the biasing force of the output cam return spring 93, relative to the biasing force of the pad spring 87 in its normal rest position, should not compress the pad spring 87.

The actuating assembly 36 basically includes an actuating arm 98, a return spring 99 and a cover 100 that are secured on the first end 48 of the left caliper portion 38 via the nut 97. The actuating assembly 36 basically includes an actuating arm 98 that is fixedly secured to the third section 90*h* of the operating shaft 90*b* of the input cam 90.

As seen in FIGS. 44–48, the actuating arm 98 has a cylindrical main portion 98*a* with an outwardly extending cable mounting portion 98*b*. The central mounting portion 98*a* has a step-shaped bore 98*c* extending therethrough with a first cylindrical section 98*d* and a second non-cylindrical section 98*e*. An abutment surface 98*f* is formed between the first cylindrical section 98*d* and the second non-cylindrical section 98*e*. This abutment surface 98*f* has three bores 102 for mounting the return spring 99 thereto. Preferably, the centers of the bores 56 are spaced approximately twenty-five degrees apart in a circumferential direction.

As seen in FIGS. 2 and 4, the cable mounting portion 98*b* has a threaded bore 98*g* at its free end for receiving a clamping bolt 103 with a clamping plate 104 to secure the end of the inner wire 25*a* of the cable 19*a* thereto. Preferably, the cable mounting portion 98*b* also has a recess 98*h* around the threaded bore 98*g* for receiving the clamping plate 104, and to prevent relative rotation of the clamping plate 104. A projection 98*i* is formed at the free end in the direction of the inner wire 25*a* of the cable 19*a*. This projection 98*i* has a curved surface for supporting the inner wire 25*a* cable 19*a* during rotation of the actuating arm 98.

As seen in FIGS. 5, 6 and 49–51, the return spring 99 is preferably a torsion spring having a coil portion 99*a* with first and second ends 99*b* and 99*c* extending in opposite axial directions from the coil portion 99*a*. The first end 99*b* is received in one of the bores 56 of the caliper portion 38, while the second end 99*c* of the return spring 99 is received in one of the bores 102 of the actuating arm 98. The first and second ends 99*b* and 99*c* are preferably longitudinally alingned with each other in the position.

The bores 56 and 102 form an adjustment mechanism for controlling the biasing force of the return spring 99 on the actuating arm 98. The biasing force between the caliper housing 30 and the actuating arm 98 can be adjusted by selecting various combinations of the bores 56 and 102. If both the first and second ends 99b and 99c of the return spring 99 are moved one hole in the same direction, then a 5° adjustment can be attained. For example, if the first and second ends 99b and 99c are located in the center bores 56 and 102, then an adjustment of both ends 99b and 99c in either direction will result in a ±5° change in the biasing or urging force of the return spring 99. Of course, the first and second ends 99b and 99c can be adjusted independently for greater adjustment.

Moreover, it will be apparent to those skilled in the art from this disclosure that additional hole bores 56 and,102 can be provided for additional adjustment. Moreover, the angular spacing of the bores 56 and 102 can be changed as needed and/or desired. In any event, the angular spacing between the bores 56 and the angular spacing between bores 102 are preferably different from each other to provide for a small incremental adjustment of the return spring 99. As seen in FIG. 4, only five of the bores 56 and 102 are illustrated since one of the bores 56 is axially aligned with one of the bores 102.

When the cable disc brake 12a is in the assembled position, the return spring 99 normally biases the input cam 90 and the actuating arm 98 to a brake releasing position. When the rider squeezes the brake lever 21a, the inner wire 25a of the cable 19a moves relative to the outer casing 24a of the cable 19a to cause the actuating arm 98 and the input cam 90 to rotate together. This rotation causes the rolling members 92 to move from the deep ends of the camming slots 90e and 91d to the shallow ends of the camming slots 90e and 91d. As the rolling members 92 move within the camming slots 90e and 91d, the output cam 91 is moved in an axial direction against the biasing force of the output cam return spring 93. This axial movement of the output cam 91 causes the left brake pad 32 to move against the urging force of the pad spring 87 to engage the rotor 20a, which is then pressed against the right brake pad 32. This engagement of the brake pads 32 with the disc brake rotor 20a causes the braking action of the cable disc brake 12a.

Figure 52:
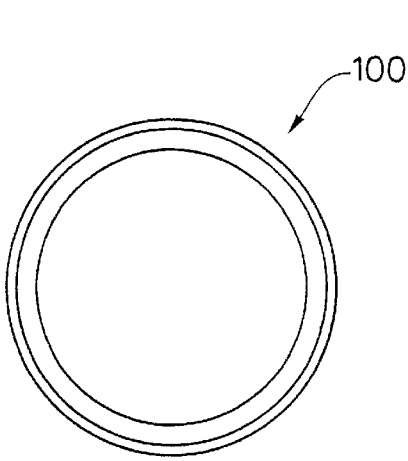
FIG. 52 is an end elevational view of the cover of the actuating assembly for the front cable disc brake illustrated in FIGS. 2 and 4–6.
Figure 53:
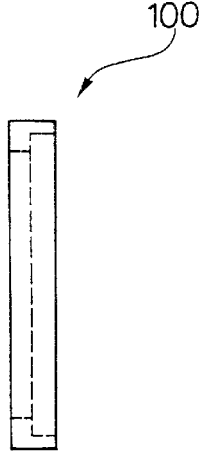
FIG. 53 is a side elevational view of the front cover illustrated in FIG. 52 for the front cable disc brake illustrated in FIGS. 2 and 4–6.

Referring now to FIGS. 5, 52 and 53, a cover 100 is located between the actuating arm 98 and the first end 48 of the left caliper portion 38. Preferably, this cover 100 fits on the outer annular end surface 54 of the first end 48 of the left caliper portion 38 so as to seal the space between the actuating arm 98 and the left caliper portion 38.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A cable disc brake comprising:

a caliper housing having a plurality of first holes arranged along a first circumferential arc with a first end hole defining one end of said first circumferential arc and a second end hole defining the other end of said first circumferential arc;

a first friction member movably coupled to said caliper housing between a release position and a braking position;

a second friction member coupled to said caliper housing and arranged substantially parallel to said first friction member to form a rotor receiving slot therein between;

a cable actuated mechanism movably coupled to said caliper housing to move said first friction member from said release position towards said second friction member to said braking position, said cable actuated mechanism having a plurality of second holes arranged along a second circumferential arc with a first end hole defining one end of said second circumferential arc and a second end hole defining the other end of said second circumferential arc; and a torsion spring having a first end received in one said first holes of said caliper housing and a second end received in one said first holes of said cable actuated mechanism to urge said cable actuated mechanism to said release position, said first and second ends of said torsion spring being axially aligned when said torsion spring is in an unloaded rest position, said caliper housing and said first end of said torsion spring being configured to be adjustable relative to each other to change an effective biasing force of said torsion spring by changing which of said first holes is coupled to said first end of said torsion spring, said cable actuated mechanism and said second end of said torsion spring being configured to be adjustable relative to each other to change said effective biasing force of said torsion spring by changing which of said second holes is coupled to said second end of said torsion spring, said first end holes being axially aligned and said first and second circumferential arcs extending in circumferentially opposite directions from said first end holes to said second end holes when said cable actuated mechanism is in a brake releasing position, said second end holes having centers circumferentially spaced about 90 degrees from each other when said cable actuated mechanism is in said brake releasing position, said first holes being circumferentially spaced apart by a different angular amount than said second holes.

2. A cable disc brake according to claim 1, wherein said cable actuated mechanism having a cable attachment point.

3. A cable disc brake according to claim 1, wherein said first holes are circumferentially spaced apart by approximately 20°, while said second holes are circumferentially spaced apart by approximately 25°.

4. A cable disc brake according to claim 1, wherein said caliper housing has at least three first holes to selectively receive said first end of said torsion spring, and said cable actuated mechanism has at least three second holes to selectively receive said second end of said torsion spring.

5. A cable disc brake according to claim 4, wherein said first and second ends of said torsion spring are arranged in said first end holes to extend in an axial direction such that said first and second ends are longitudinally aligned when said cable actuated mechanism is in said brake releasing position.

6. A cable disc brake according to claim 1, wherein said cable actuated mechanism includes a cam assembly.

7. A cable disc brake according to claim 6, wherein said cam assembly includes a first cam member having a set of first camming surfaces and a second cam member having a set of second camming surfaces with rolling members located between said first and second camming surfaces.

8. A cable disc brake according to claim 7, wherein said rolling members are balls.

9. A cable disc brake comprising:

a caliper housing having a plurality of first holes arranged along a first circumferential arc with a first end hole defining one end of said first circumferential arc and a second end hole defining the other end of said first circumferential arc;

a first friction member movably coupled to said caliper housing between a release position and a braking position;

a second friction member coupled to said caliper housing and arranged substantially parallel to said first friction member to form a rotor receiving slot therein between;

a cable actuated mechanism including an actuating arm and a cam assembly movably coupled to said caliper housing to move said first friction member from said release position towards said second friction member to said braking position, said actuating arm having a biasing member receiving recess and a plurality of second holes arranged along a second circumferential arc with a first end hole defining one end of said second circumferential arc and a second end hole defining the other end of said second circumferential arc; and a biasing member arranged in said biasing member receiving recess, said biasing member having a first end coupled to said caliper housing and a second end coupled to said actuating arm to urge said cable actuated mechanism to a brake releasing position, said caliper housing and said first end of said biasing member being configured to be adjustable relative to each other to change an effective biasing force of said biasing member, said cable actuated mechanism and said second end of said biasing member being configured to be adjustable relative to each other to change said effective biasing force of said biasing member, said first and second ends of said biasing member being axially aligned when said biasing member is in an unloaded rest position, said cam assembly including a first cam member having a set of first camming surfaces and a second cam member having a set of second camming surfaces with rolling members located between said first and second camming surfaces, said first cam member being rotatably mounted within said caliper housing but non-movably mounted in the axial direction, and said second cam member being movably mounted in the axial direction but non-rotatably mounted, said first cam member having an operating shaft extending out of said housing that is removably coupled to said actuating arm, said first end holes being axially aligned and said first and second circumferential arcs extending in circumferentially opposite directions from said first end holes to said second end holes when said cable actuated mechanism is in said brake releasing position, said second end holes having centers circumferentially spaced about 90 degrees from each other when said cable actuated mechanism is in said brake releasing position, said first holes being circumferentially spaced apart by a different angular amount than said second holes.

10. A cable disc brake according to claim 9, wherein said biasing member is a torsion spring with said first end coupled to said caliper housing said second end coupled to said actuating arm.

11. A cable disc brake according to claim 10, wherein said actuating arm has a cable attachment member thereon.

12. A cable disc brake according to claim 9, wherein said first and second ends of said biasing member are arranged in said first end holes to extend in an axial direction such that said first and second ends are longitudinally aligned when said cable actuated mechanism is in said brake releasing position.

13. A cable disc brake comprising:

a caliper housing having a plurality of first holes arranged along a first circumferential arc with a first end hole defining one end of said first circumferential arc and a second end hole defining the other end of said first circumferential arc;

a first friction member movably coupled to said caliper housing between a release position and a braking position;

a second friction member coupled to said caliper housing and arranged substantially parallel to said first friction member to form a rotor receiving slot therein between;

a cable actuated mechanism movably coupled to said caliper housing to move said first friction member from said release position towards said second friction member to said braking position, said cable actuated mechanism including a first cam member having a set of first camming surfaces and a second cam member having a set of second camming surfaces with rolling members located between said first and second camming surfaces, said first cam member being rotatably mounted within said caliper housing but non-movably mounted in the axial direction, and said second cam member being movably mounted in the axial direction but non-rotatably mounted, said cable actuated mechanism having a plurality of second holes arranged along a second circumferential arc with a first end hole defining one end of said second circumferential arc and a second end hole defining the other end of said second circumferential arc; and a biasing member having a first end received in one said first holes of said caliper housing and a second end received in one said first holes of said cable actuated mechanism to urge said cable actuated mechanism to said release position, said first and second ends of said biasing member being axially aligned when said biasing member is in an unloaded rest position, said caliper housing and said first end of said biasing member being configured to be adjustable relative to each other to change an effective biasing force of said biasing member by changing which of said first holes is coupled to said first end of said biasing member, said cable actuated mechanism and said second end of said biasing member being configured to be adjustable relative to each other to change said effective biasing force of said biasing member by changing which of said second holes is coupled to said second end of said biasing member, said first end holes being axially aligned and said first and second circumferential arcs extending in circumferentially opposite directions from said first end holes to said second end holes when said cable actuated mechanism is in a brake releasing position, said second end holes having centers circumferentially spaced about 90 degrees from each other when said cable actuated mechanism is in said brake releasing position, said first holes being circumferentially spaced apart by a different angular amount than said second holes.

14. A cable disc brake according to claim 13, wherein said first holes are circumferentially spaced apart by approximately 20°, while said second holes are circumferentially spaced apart by approximately 25°.

15. A cable disc brake according to claim 13, wherein said first and second ends of said biasing member are arranged in said first end holes to extend in an axial direction such that said first and second ends are longitudinally aligned when said cable actuated mechanism is in said brake releasing position.

16. A cable disc brake according to claim 13, wherein said caliper housing has a cable adjusting unit coupled thereto.

* * * * *

UNITED STATES PATENT AND TRADEMARK OFFICE
CERTIFICATE OF CORRECTION

PATENT NO. : 6,394,236 B1
DATED : May 28, 2002
INVENTOR(S) : Tatsuya Matsushita

It is certified that error appears in the above-identified patent and that said Letters Patent is hereby corrected as shown below:

Column 1,
Line 53, "requires" should read -- require --.

Column 2,
Line 29, "first end friction" should read -- first friction --.
Line 30, "therein between" should read -- therebetween --.
Line 61, "lines" should read -- line --.

Column 3,
Line 14, "lines" should read -- line --.

Column 4,
Lines 22 and 36, "lines" should read -- line --.
Line 37, "is an" should read -- is a side elevational view of an --.

Column 5,
Line 19, " handlebar 14" should read -- a handlebar 14, --.
Line 20, "16a and 16b" should read -- 16a and 16b, --.

Column 6,
Line 23, "cable brake discs" should read -- cable disc brakes --.
Lines 46, 49 and 52, "housings" should read -- portions --.

Column 7,
Line 4, "end surface" should read -- the end surface --.
Line 16, "the disc brake device" should read -- the cable disc brake --.
Line 28, "The slots 65 that are" should read -- The slots 65 are --.
Line 32, "housings" should read -- portions --.
Line 37, "housing" should read -- portion --.

Column 8,
Line 10, "except for." should read -- except for --.
Line 42, "having" should read -- has --.
Line 48, "housings" should read -- portions --.

UNITED STATES PATENT AND TRADEMARK OFFICE
CERTIFICATE OF CORRECTION

PATENT NO. : 6,394,236 B1
DATED : May 28, 2002
INVENTOR(S) : Tatsuya Matsushita

It is certified that error appears in the above-identified patent and that said Letters Patent is hereby corrected as shown below:

<u>Column 9,</u>
Line 6, "right. brake" should read -- right brake --.
Line 31, "cylindrical" should read -- non-cylindrical --.

<u>Column 10,</u>
Line 37, "central mounting" should read -- cylindrical main --.
Line 56, "wire 25a cable 19a" should read -- wire 25a of cable 19a --.

<u>Column 11,</u>
Line 14, "hole" should read -- holes --.
Line 14, "and," should read -- and --.

<u>Column 12,</u>
Line 13, "one said" should read -- one of said --.
Line 15, "one said first holes" should read -- one of said second holes --.
Line 43, "having" should read -- has --.

<u>Column 14,</u>
Line 44, "one said" should read -- one of said --.
Line 46, "one said first holes" should read -- one of said second holes --.

Signed and Sealed this

Twenty-second Day of July, 2003

JAMES E. ROGAN
*Director of the United States Patent and Trademark Office*